(12) United States Patent
Kim et al.

(10) Patent No.: US 7,085,404 B2
(45) Date of Patent: Aug. 1, 2006

(54) IMAGE ANALYSIS SYSTEM AND METHOD OF BIOCHIP

(75) Inventors: Jin Hyuk Kim, Seongnam (KR); Yong Sung Lee, Seoul (KR); Young Seek Lee, Seoul (KR)

(73) Assignee: Industry-University Cooperation Foundation, Hangyang University, Seoul (KR)

( * ) Notice: Subject to any disclaimer, the term of this patent is extended or adjusted under 35 U.S.C. 154(b) by 680 days.

(21) Appl. No.: 10/267,745

(22) Filed: Oct. 10, 2002

(65) Prior Publication Data

US 2003/0072476 A1 Apr. 17, 2003

(30) Foreign Application Priority Data

Oct. 11, 2001 (KR) ................................ 2001-62620

(51) Int. Cl.
*G06K 9/00* (2006.01)

(52) U.S. Cl. ............................ 382/129; 382/254; 435/6

(58) Field of Classification Search ................ 382/128, 382/129, 130, 131, 132, 133, 134, 162, 165, 382/169, 171, 178, 181, 209, 260, 274, 254, 382/275, 266, 305; 435/6, 287.1; 377/10
See application file for complete search history.

(56) References Cited

U.S. PATENT DOCUMENTS 5,858,671 A * 1/1999 Jones ............................. 435/6
6,287,765 B1 * 9/2001 Cubicciotti ..................... 435/6
6,599,703 B1 * 7/2003 Jones ............................. 435/6

(Continued)

OTHER PUBLICATIONS

Kim, Jin Hyuk et al., "A novel method using edge detection for signal extraction from CDNA microarray image analysis", Experimental and Molecular Medicine, vol. 33, No. 2, pp. 83-88, Jun. 2001.*

(Continued)

*Primary Examiner*—Jingge Wu
*Assistant Examiner*—Seyed Azarian
(74) *Attorney, Agent, or Firm*—Harness, Dickey & Pierce, P.L.C.

(57) ABSTRACT

Disclosed is a biochip image analysis system which comprises an image storage unit for storing images including an original image of a biochip comprising a set of specific genes expressed in different environments by fluorescent bases of different colors; an image converter for converting the original image into a test image, forming an overlapped image and a color image, and storing the images in the image storage unit; an edge detector for separating the spot-formed genes from the test image, generating spot and background templates, and detecting an edge to measure expression degrees of the genes; a data processor for generating statistical data using the spot and background templates, and performing luminance correction; and a data storage unit for storing the statistical data.

5 Claims, 6 Drawing Sheets

U.S. PATENT DOCUMENTS 6,633,659 B1 * 10/2003 Zhou .......................... 382/129
6,731,781 B1 * 5/2004 Shams et al. ................ 382/129
6,887,701 B1 * 5/2005 Anderson et al. ......... 435/287.1

OTHER PUBLICATIONS

Kim, Jin Hyuk et al., "A novel method using edge detection for signal extraction from cDNA microarray image analysis", Experimental and Molecular Medicine, vol. 33, No. 2, pp. 83-88, Jun. 2001.

Brown, Carl S., et al., "Image metrics in the statistical analysis of DNA microarray data," Proc. Nat'l. Acad. Sci. USA, vol. 98, No. 19, pp. 8944-8949.

* cited by examiner

IMAGE ANALYSIS SYSTEM AND METHOD OF BIOCHIP

CROSS REFERENCE TO RELATED APPLICATION

This application is based on Korea Patent Application No. 2001-62620 filed on Oct. 11, 2001 in the Korean Intellectual Property Office, the content of which is incorporated herein by reference.

BACKGROUND OF THE INVENTION (a) Field of the Invention

The present invention relates to an image analysis system and method of a biochip. More specifically, the present invention relates to an image analysis system and method for detecting an edge of a cDNA (complementary deoxyribonucleic acid) chip.

(b) Description of the Related Art

Biochips include glass or nylon membranes designed for accelerating genetic research, they are designed for providing a plurality of short DNA strands and essential genetic information for determining living creatures' characteristics on a single substrate, and they are frequently used as test tubes for chemical samples.

Biochips may accelerate checking of about 30,000 genes in human DNA, and progression of global coordinated research thereof, the so-called human genome project, for making a human genome map.

Biochips are classified into protein chips, oligonucleotide chips, and cDNA chips.

Regarding the protein chips, dozens to hundreds of different proteins or ligands are provided on the chip surface in a micro-array format. In this instance, when a sample is added to the protein chip, biomolecules specifically interactive with the proteins or ligands provided on the chip surface remain, and others are washed away.

Existence states or functions of the above interactive biomolecules are analyzed using an SPR (surface plasmon resonance) device, a mass spectrometer, or a fluorescence spectrometer. The protein chips may be effectively applied to cancers, AIDS (acquired immune deficiency syndrome), early diagnosis of human diseases, causal examination of diseases, and understanding of in vivo signal transduction systems.

Oligonucleotide chips use 25 oligonucleotides to search for mutations of specified genes. That is, oligonucleotide chips adopt a photolithography method to synthesize the oligonucleotides of a desired nucleotide sequence on a slide glass, and they search for mutations of tumor suppressive genes such as p53 and BRCA1 using the synthesized oligonucleotides.

Oligonucleotide chips may be applied to inherited disorder fields including gene mutation detection, drug resistance detection diagnosis, SNP (single nucleotide polymorphism) analysis, histocompatibility and organ transplantation assays, identification of pathogenic microorganisms, nucleotide sequence analysis, paternity tests, interracial polymorphism analysis, and forensic medicine.

As for cDNA chips, thousands to tens of thousands of genes are formed as 150 μm-sized spots on a predetermined slide glass substrate to create a cDNA micro-array, fluorescent labeling is performed on RNAs (ribonucleic acids) of two groups to be compared, that is, the RNA of a control group and that of an experimental group, and they are competitively combined to the DNA chip so as to check relative gene expression patterns.

The cDNA chips may be used for high throughput gene expression—analysis, human disease diagnosis and monitoring, biological response studies of environmental factors, food inspection, new drug development, clinicopathology, and for animal and plant quarantine.

A method for manufacturing cDNA chips will now be described.

Test genes are planted on a glass slide to thereby generate a cDNA micro-array chip having thousands of test genes. A cDNA micro-array chip generated in this manner contributes greatly to analysis of particular genes expressed in two different environments.

Messenger RNA (referred to as mRNA hereinafter) is extracted from cells obtained from the two different environments, and bases having fluorescence of different colors are provided to the mRNAs when the mRNAs are reverse-transcribed, thereby synthesizing red (Cy5) or green (Cy3) cDNAs or tagging the mRNAs.

In this instance, genes expressed in yellow are provided by a complementary color of green and red, and it is found that similar amounts of the above-noted genes are expressed under the two environments.

The two synthesized cDNAs or mRNAs as described above are mixed at a predetermined identical amount to thus combine them on a single cDNA micro-array chip, and when uncombined genes are washed from the chip, the chip is read by a laser fluorescent scanner. Fluorescence degrees of the respective genes represent the genes' expression degrees, and the degrees are analyzed by a computer.

When analyzing gene information, since the cDNA micro-array chip has cDNA of different genes formed as spots of about 100 μm diameter and printed on a glass slide or nylon fabric, the respective spots are separated into segments so as to measure expression degrees of the respective genes.

In this instance, a reference circle of a predetermined size is injected on the center of the segment so as to extract an effective spot, and if the size of the reference circle is greater than that of the spot, the background as well as the spot are positioned in the reference circle, and accordingly, errors occur in data mean values.

In another case, when the center of the spot is not located on the center of the segment but it digresses to a side, since the positions of the reference circle and the spot are not matched, a portion of the spot located in the reference circle is used as effective information, and the remaining spot area outside the reference circle is processed as a background to thereby increase data error rates.

In order to correct the errors generated from the above-described method, the intensity in the segment is represented in a histogram format, predetermined amounts of data values provided on the top and bottom portions of the histogram are discarded, and remaining data values are taken as effective information. In this case, effective data values may be problematically discarded even when correct data are extracted.

SUMMARY OF THE INVENTION

It is an object of the present invention to provide a biochip image analysis system and method for extracting edge information used for analyzing gene information of a cDNA chip to thereby reduce data error rates.

In one aspect of the present invention, a biochip image analysis system comprises: an image storage unit for storing various categories of image information including an original image of a biochip comprising a set of specific genes each expressed in different environments by fluorescent bases of different colors; an image converter for converting the biochip's original image stored in the image storage unit into a test image, forming an overlapped image and a color image from the test image, and storing the images in the image storage unit; an edge detector for separating the genes in the spot form from the test image stored in the image storage unit, generating a spot template and a background template, and detecting an edge so as to measure expression degrees of the respective genes; a data processor for generating statistical data on the basis of the spot template and the background template generated through the image storage unit and the edge detector, and performing luminance correction; a data storage unit for storing the statistical data generated by the data processor; and an input/output unit for outputting the image or the data stored in the image storage unit, the edge detector, and the data storage unit to a screen according to a request by a user.

In another aspect of the present invention, a biochip image analysis method comprises: (a) extracting an original image according to a fluorescent base from a biochip comprising a set of specific genes each expressed in a different environment by a fluorescent base of a different color; (b) converting the original image into a test image, and extracting an overlapped image and a color image from the test image; (c) respectively separating the genes in the spot form from the test image, generating a spot template and a background template including an area within a predetermined distance excluding the spot, and detecting an edge; (d) outputting statistical data on the basis of the spot template and the background template generated in (b) or (c), and performing luminance correction; and (e) displaying the images and the data generated in (b) to (d) to a screen according to a request by a user.

In (b), the original image has an unsigned 16-bit file format, and the original image is converted into an 8-bit test image so as to increase an image processing speed and output the original image to the user through a screen.

In (b), the test image is colored in different pseudo-colors according to fluorescent bases, and is overlapped to generate a color image, and an overlapped image is generated using the pixels having greater values from among the pixels on the identical location of the test image.

The (c) comprises: a segmentation step for separating respective spots from the test image in the spot format to generate a spot segment coordinate; an edge detection step for extracting a spot segment of an $n^{th}$ coordinate from the segmentation step to generate a spot edge and a background edge; a template generation step for transplanting the spot edge and the background edge generated in the edge detection step onto an empty template, and detecting an edge on a subsequent coordinate's spot segment; and a termination step for terminating the generation of a spot template and a background template when the edge detection of all coordinates is generated in the segmentation step.

The (c) further comprises: an enhancement step for enhancing the luminance of the test image to emphasize the edge; a comparison step for comparing a previously established critical value with a mean value of a predetermined number of pixels from the edge emphasized in the enhancement step to generate an edge; an effective edge extraction step for removing edges under a reference size from the edges detected in the comparison step, and connecting partially opened edges by the shortest distance; and a template storage step for generating a spot template and a background template comprising the edges extracted in the effective edge extraction step, and storing the spot template and the background template.

The (c) still further comprises: a reference template generation step for generating a reference template on the center of which a reference circle is formed on the basis of a mean size of the spots from the test image; an enhancement step for enhancing the luminance of the test image to emphasize the edge; a comparison step for comparing a previously established critical value with a mean value of a predetermined number of pixels from the edge emphasized in the enhancement step to generate an edge; an effective edge extraction step for removing edges under a reference size from the edges detected in the comparison step, and connecting partially opened edges by the shortest distance to generate an effective edge template; and a template storage step for synthesizing the effective edge template and the reference template to generate a spot template, synthesizing the inverted effective edge template and the inverted reference template to generate a background template, and storing the spot template and the background template.

The comparison step comprises a smoothing step for reducing the gradient of the edge emphasized in the enhancement step to extract effective edges.

In (d), various measured values including a mean value, a standard deviation, a central value, a mode, a spot's area and circumference, a number of holes in the spot, and a fragmentation state are stored as statistical data on the basis of the spot template and the background template.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

A system according to a preferred embodiment of the present invention relates to a cDNA micro-array chip from among biochips each including a predetermined set of genes that are expressed under different environments according to color-different fluorescent bases Cy3 and Cy5.

Figure 1:
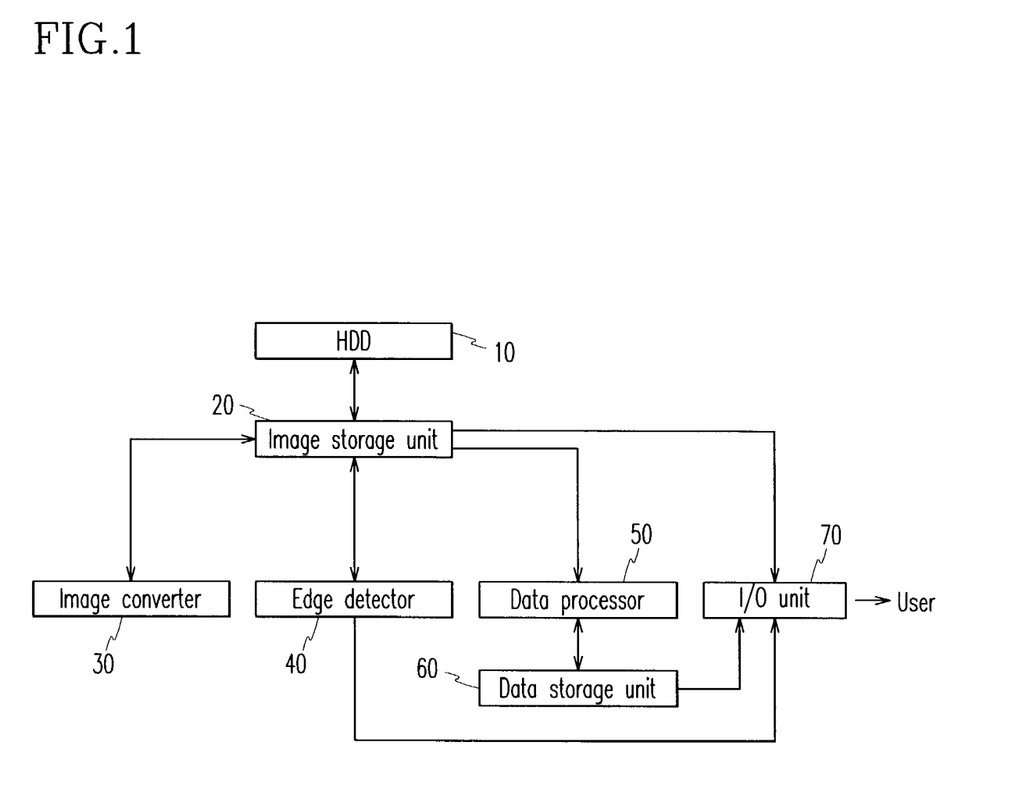
FIG. 1 shows a block diagram of a biochip's image analysis system according to a preferred embodiment of the present invention.

FIG. 1 shows a block diagram of a biochip's image analysis system according to a preferred embodiment of the present invention.

As shown, the system comprises: an image storage unit 20 for receiving two cDNA micro-array images in a 16-bit TIFF (tag image file format) format from a HDD (hard disk drive) 10, scanning the images according to the fluorescent bases Cy3 and Cy5 to store the original images, and storing various kinds of converted image information; an image converter 30 for converting the original images stored in the image storage unit 20 into test images, generating overlapped images and color images from the test images, and storing the overlapped images and the color images; an edge detector 40 for separating spot-formed genes from the test images stored in the image storage unit 20, generating spots and background templates to detect an edge, and storing the respective templates in the image storage unit 20; a data processor 50 for generating statistical data on the basis of the spots and the background templates, and performing luminance correction; a data storage unit 60 for storing the statistical data generated by the data processor 50; and an input/output (I/O) unit 70 for displaying on a screen the images and the data stored in the image storage unit 20, the edge detector 40, and the data storage unit 60.

The image converter 30 converts 16-bit original images into 8-bit test images that are two images in Cy3 and Cy5, colors the Cy3 image in pseudo-green and the Cy5 image in pseudo-red, matches the two images, and overlaps them, and the image converter 30 compares the two images Cy3 and Cy5, respectively selects a pixel at an identical location and with a greater value from the compared ones, and uses all the selected pixels of a greater value to configure an 8-bit image.

Therefore, the image storage unit 20 stores two 16-bit images, three 8-bit images, and a color image according to operation of the image converter 30.

In general, the cDNA micro-array chip scans twice with lasers of two different wavelengths so as to find the Cy3 and Cy5 fluorescent bases, and the positions of the cDNA micro-array chip may be mismatched with each other because of many factors during the two scanning operations. Hence, the image converter 30 optionally performs automated position correction for matching the positions of the two images before processing the images.

A cDNA micro-array image represents a scanned image on which respective cDNAs of different genes are printed in a spot form of about 100 µm diameter, and the image includes approximately 10,000 spots, the number of which may be varied according to chip categories.

Therefore, the edge detector 40 performs a segmentation process for separating the respective spots so as to measure expression degrees of the respective genes, and measures the luminance of the spots and the background on the cDNA micro-array image to thereby detect edges.

In this instance, a segment coordinate of the spot is stored in an array format, index information may be input if needed, and the remaining region excluding the spot in a single segment is defined as a background.

In the above, the spot's index information is classified by a plurality of sub-grids of the cDNA micro-array chip, a column index and a row index of each sub-grid are generated, and a column index and a row index of a segment of each spot in a sub-grid are generated.

For example, the spot's index information is generated in the (a, b, c, d) format, and the 'a' and the 'b' represent indexes of the sub-grid, and the 'c' and the 'd' indicate indexes of a spot in the corresponding sub-grid.

The data processor 50 generates various measurement values including a mean value, a standard deviation, a central value, a mode, an area and a circumference of a spot, a number of holes in a spot, and a fragmentation state as statistical data on the basis of the spot template and the background template acquired from the edge detector 40, and stores them in the data storage unit 60.

In this instance, the statistical data may be linked to the spot's index information.

The fluorescent bases Cy3 and Cy5 have different sensitivities on the fluorescence, and the RNA samples are tagged with the fluorescent bases Cy3 and Cy5 by identical amounts, but it is impossible to use exactly identical amounts of the RNAs and the fluorescent bases Cy3 and Cy5.

Therefore, the data processor 50 performs a normalization process for correcting a state where the luminance of an image is more strongly measured than that of the other image.

An operation of the biochip image analysis system as configured above will now be described with reference to drawings.

Figure 2:
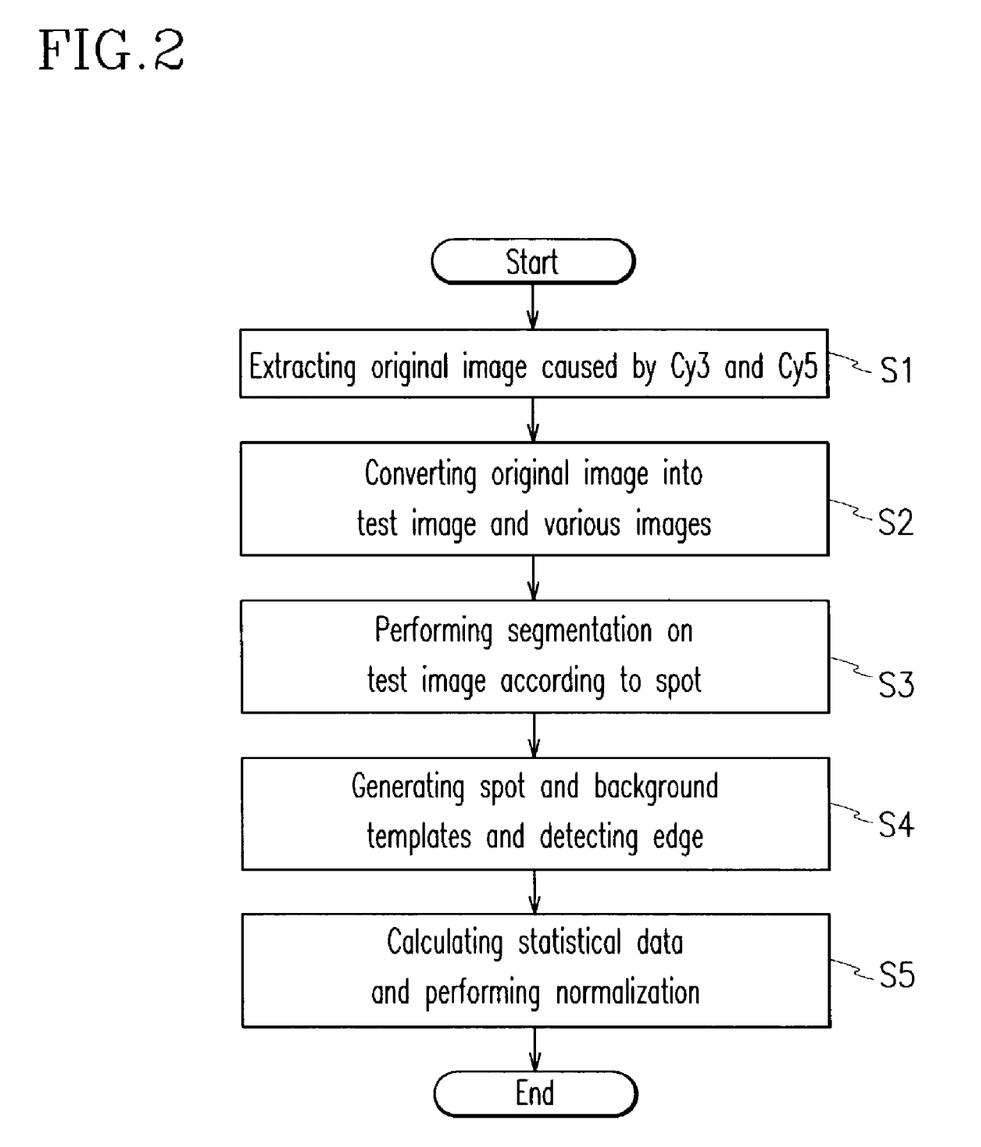
FIG. 2 shows a flowchart of a biochip's image analysis method according to a preferred embodiment of the present invention.

FIG. 2 shows a flowchart of a biochip's image analysis method according to a preferred embodiment of the present invention.

Referring to FIG. 2, original images in the 16-bit TIFF format are extracted from the HDD 10, and they are stored in the image storage unit 20 in step S1.

The image converter 30 converts the original images into 8-bit test images, and uses the 8-bit test images to generate overlapped images and color images to be displayed to a user in step S2.

The edge detector 40 performs segmentation on the test images according to the spots and generates the spots' segment coordinate so as to measure expression degrees of the respective genes in step S3, generates spots and background templates through the segmentation process, and measures the luminance of the spots and the background to detect an edge in step S4.

The data processor 50 generates statistical data on the basis of the spots and the background templates acquired from the above process, and it performs normalization for correcting the luminance of the two images caused by Cy3 and Cy5 in step S5.

Figure 3:
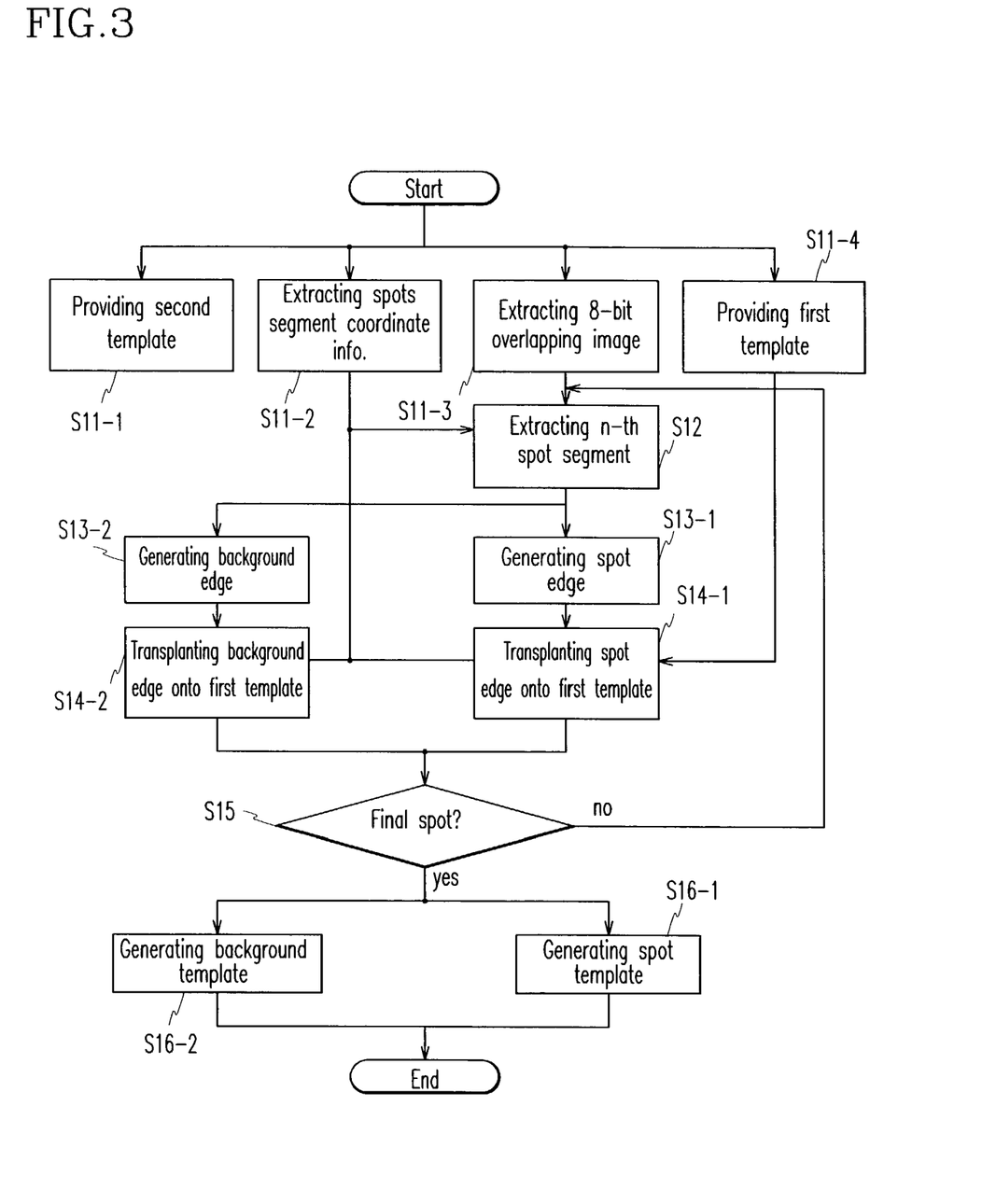
FIG. 3 shows a flowchart of an image processing stage of the biochip's image analysis method according to a preferred embodiment of the present invention.

FIG. 3 shows a flowchart of an image processing stage of the biochip's image analysis method according to a preferred embodiment of the present invention.

As shown, the edge detector 40 provides an 8-bit empty first template provided for a spot template and an 8-bit second template provided for a background template in steps S11-4 and S11-1, and calls overlapped 8-bit images and segment coordinate data of the spots by segmentation from the image storage unit 20 and the data storage unit 60 in steps S11-3 and S11-2.

The edge detector 40 uses the spot's segment coordinate and the overlapped 8-bit image to extract an $n^{th}$ spot segment in step S12, and generates in steps S13-1 and S13-2 a spot edge and a background edge from the spot segment extracted from the above process.

When generating the spot edge and the background edge, the edge detector 40 transplants the spot edge onto the first template in step S14-1, and the background edge onto the second template in step S14-2.

The edge detector 40 checks in step S15 whether the above-noted spot is a final spot according to the spot's segment coordinate information, and when it is found to be the final one, the edge detector 40 generates a spot template and a background template in steps S16-1 and S16-2.

When the spot is found to not be the final one, the edge detector 40 returns to the previous step S12 to repeat the processes for extracting an $(n+1)^{th}$ spot segment and generating a spot template and a background template.

Figure 4:
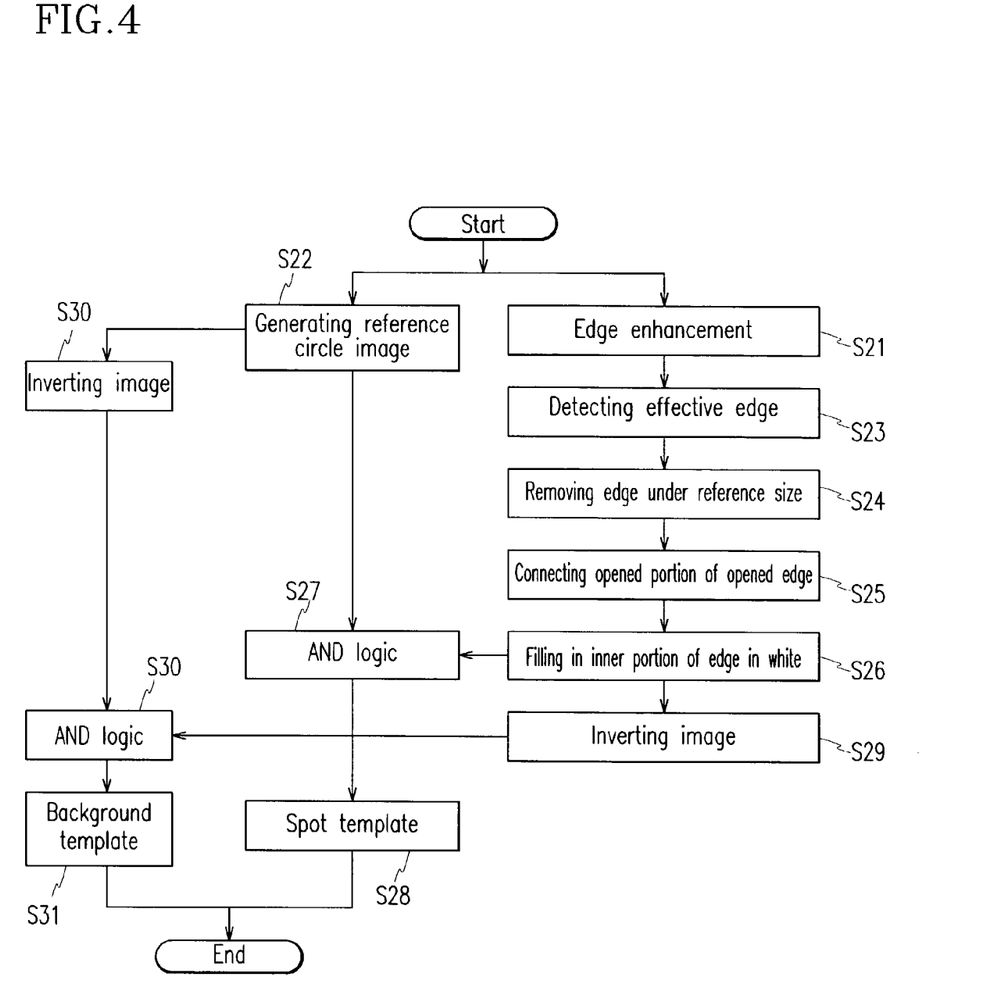
FIG. 4 shows a flowchart of an edge-detecting process of the biochip's image analysis method according to a preferred embodiment of the present invention.

FIG. 4 shows a flowchart of an edge-detecting process of the biochip's image analysis method according to a preferred embodiment of the present invention.

As shown, the edge detector 40 uses a spot segment including a spot from among the test images stored in the image storage unit 20, and makes it pass a convolution kernel to perform an edge enhancement process in step S21.

The edge detector 40 generates an image having a size identical with that of a segment of a micro-array image including a spot, generates a reference-circle image filled in white and having a size similar to the mean size of the spot on the center of the image, and stores it as a template in step S22.

The edge detector 40 performs a critical value comparison process for extracting effective edges from the spot segment in step S23.

Regarding the critical value comparison process, a maximum critical value and a minimum critical value for sensing the spots in the best way are previously established on the micro-array image, a mean value of predetermined number of adjacent pixels, and means of two arbitrary pixel groups of pixels are obtained. If the one and the other are greater and less than the maximum and minimum critical values, the representative pixels in each group are selected. An edge gradient is calculated using a distance between the two selected pixels, and when the distance is greater than a reference value, it is determined to be an edge, and when the distance is less than the reference value, it is determined to not be an edge.

In the above critical value comparison process, a smoothing process may be executed before the edge state is determined through the critical value comparison. In the smoothing process, a spot segment is filtered using a Gaussian smoothing filter having a predetermined sigma value so as to reduce the edge gradient and sense effective edges.

The edge detector 40 previously establishes a reference size of the edge, and removes the edges of less than the reference size from among the edges determined as edges in the above process, in step S24. When a portion of the edge is opened, the edge detector 40 connects the opened portion of the edge by the shortest distance so that the edge may be of a closed curve in step S25.

Figure 5A:
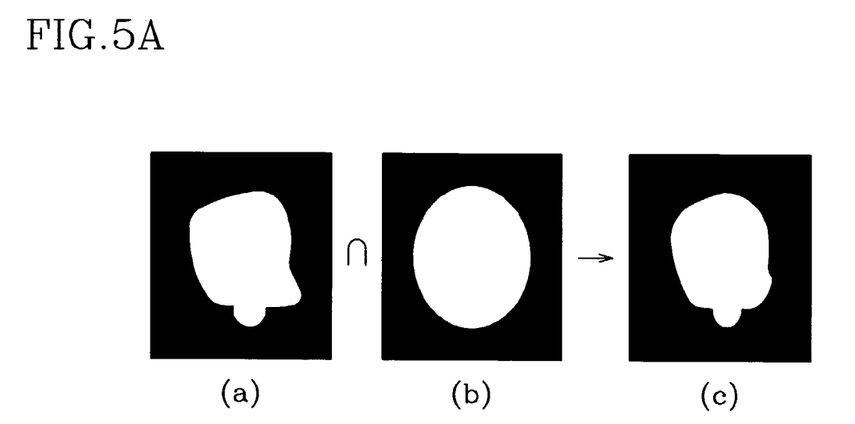
FIG. 5(a) shows a template configuration for generating a spot template.

FIG. 5(a) shows a template configuration used for generating a spot template.

When the edge is detected as described above, the inner portion of the edge is filled in white in step S26 as shown in FIG. 5(a), and the template 'a' having the edge in white and the template 'b' of the previously stored reference circle image are passed through an AND logic in step S27 to thereby generate a spot template as shown in (c) of FIG. 5(a) in step S28.

Figure 5B:
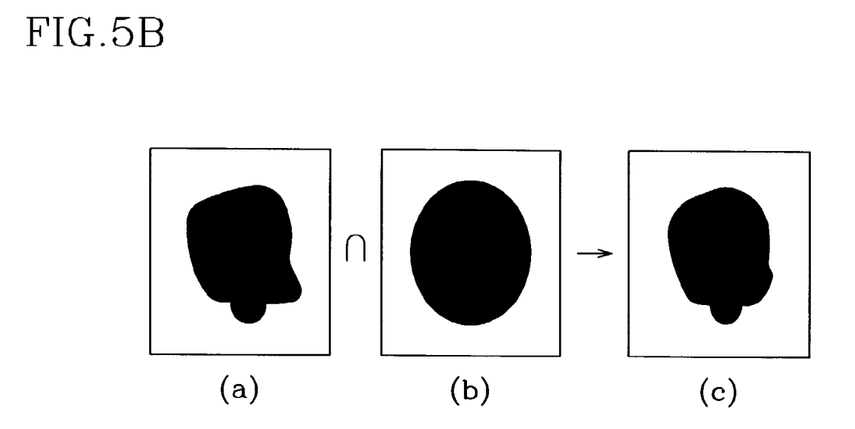
FIG. 5(b) shows a template configuration diagram for generating a background template.

FIG. 5(b) shows a template configuration diagram for generating a background template.

As shown, when the edge detector 40 inverts the template having the edge filled in white, a template (d) as shown in FIG. 5(b) is generated in step S29. When the template (d) of FIG. 5(b) and the template (e) of the background reference circle image inverted from the template of the reference circle image are passed through the AND logic, a background template (f) of FIG. 5(b) is generated in steps S30 and S31.

Referring to FIG. 4, it is desirable for the edge detector 40 to generate a reference circle image at the time of edge detection, and generate a spot template and a background template through performing AND logic on the reference circle and the edge, but when the data are relatively correct, the edge detector may generate the spot template and the background template through the detected edge via the noted steps S23 to S25 without generating a reference circle image.

Figure 6:
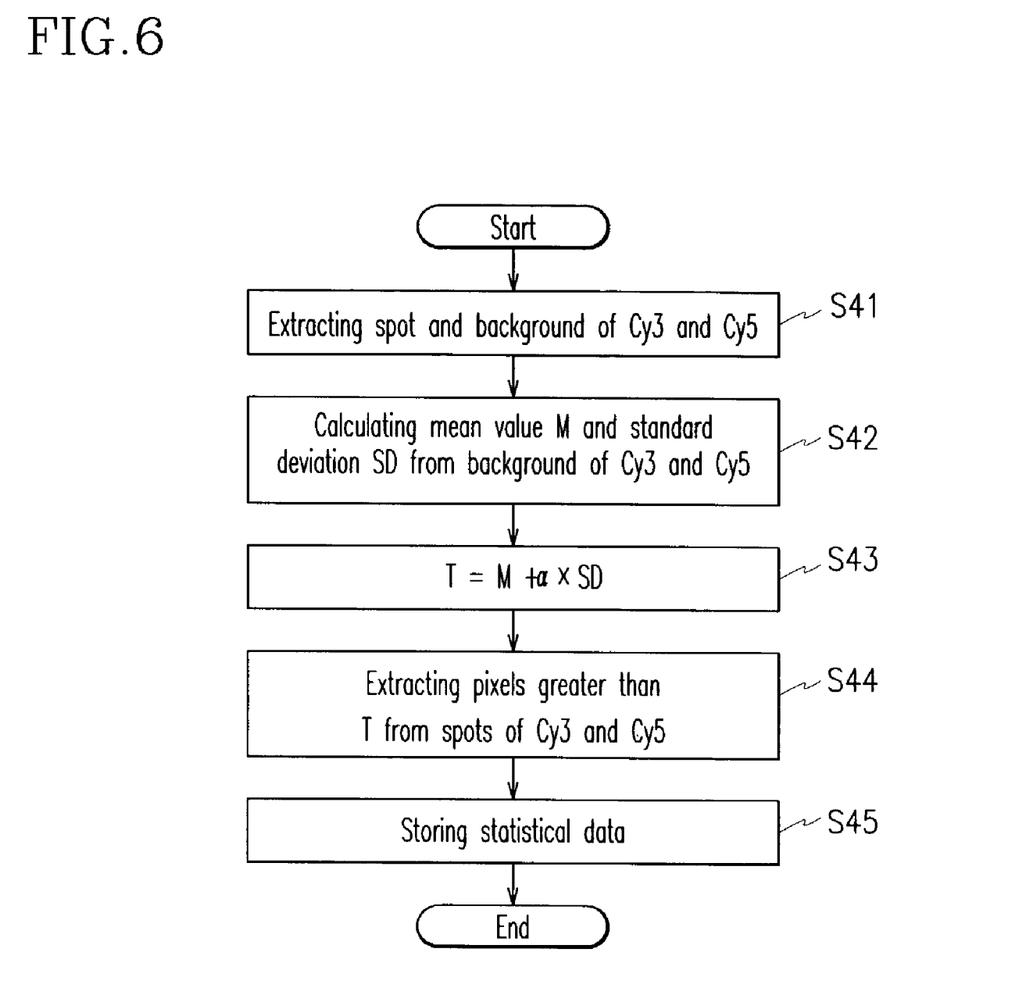
FIG. 6 shows a flowchart for a data process stage of the biochip's image analysis method according to a preferred embodiment of the present invention.

FIG. 6 shows a flowchart for a data process stage of the biochip's image analysis method according to a preferred embodiment of the present invention.

As shown, the data processor 50 uses 16-bit original images Cy3 and Cy5, spot and background templates, and the spot's segment coordinate information to extract a first image segment, and to extract a spot and a background of Cy3 and Cy5 from the first image segment in step S41.

The data processor 50 calculates a mean value M and a standard deviation SD from the backgrounds of the extracted Cy3 and Cy5, and solves the equation $T=M+\alpha \times SD$ using the mean value and the standard deviation in step S43, where '$\alpha$' represents a value selected by a user so that the user may assign the threshold for the pixels in the spot data options.

The data processor 50 extracts pixels having a value greater than the value T from the spots of Cy3 and Cy5 in step S44, and stores the extracted mean value, the standard deviation, and the pixels as statistical data in the data storage unit 60 in step S45.

In addition, the data processor 50 calculates various measurement values including a mode, the spot's area and circumference, segmentation states, and a number of holes in the spot, and stores the measurement values in the data storage unit 60 as statistical data as well as the above-noted data.

In order to analyze gene information of the cDNA micro-array chip of among the biochips, the biochip's image analysis system and method according to the preferred embodiment of the present invention separates the genes of spot forms to generate the spot's segment coordinate, and uses a previously established critical value or a reference circle to detect spot and background edges, thereby greatly reducing data error rates and extracting effective information.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A biochip image analysis method, comprising:
   (a) extracting an original image according to a fluorescent base from a biochip comprising a set of specific genes each expressed in a different environment by a fluorescent base of a different color;
   (b) converting the original image into a test image, and extracting an overlapped image and a color image from the test image;
   (c) respectively separating the genes in the spot form from the test image, generating a spot template and a background template including an area within a predetermined distance excluding the spot, detecting an edge for enhancing the luminance of the test image to emphasize the edge for comparing a previously established critical value with a mean value of a predetermined number of pixels from the edge emphasized in the enhancing step, to generate an edge, extracting an effective edge for removing edges under a reference size from the edges detected in the comparing step, and connecting partially opened edges by the shortest distance and storing a template for generating a spot template and a background template comprising the edges extracted in the effective edge extraction step, and storing the spot template and the background template, and (d) outputting statistical data on the basis of the spot template and the background template generated in (b) or (c), and performing luminance correction.

2. A biochip image analysis method, comprising:

(a) extracting an original image according to a fluorescent base from a biochip comprising a set of specific genes each expressed in a different environment by a fluorescent base of a different color;

(b) converting the original image into a test image, and extracting an overlapped image and a color image from the test image;

(c) respectively separating the genes in the spot form from the test image, generating a spot template and a background template including an area within a predetermined distance excluding the spot, detecting an edge for generating a reference template on the center of which a reference circle is formed on the basis of a mean size of the spots from the test image; an enhancing step for enhancing the luminance of the test image to emphasize the edge for comparing a previously established critical value with a mean value of a predetermined number of pixels from the edge emphasized in the enhancing step, to generate an edge, extracting an effective edge for removing edges under a reference size from the edges detected in the comparing step, and connecting partially opened edges by the shortest distance to generate an effective edge template storing a template for synthesizing the effective edge template and the reference template to generate a spot template, synthesizing the inverted effective edge template and the inverted reference template to generate a background template, and storing the spot template and the background template, and (d) outputting statistical data on the basis of the spot template and the background template generated in (b) or (c), and performing luminance correction.

3. The method of claim 1, wherein the comparison step comprises a smoothing step for reducing the gradient of the edge emphasized in the enhancement step to extract effective edges.

4. The method of claim 2, wherein the comparison step comprises a smoothing step for reducing the gradient of the edge emphasized in the enhancement step to extract effective edges.

5. A biochip image analysis method, comprising:

(a) extracting an original image according to a fluorescent base from a biochip comprising a set of specific genes each expressed in a different environment by a fluorescent base of a different color;

(b) converting the original image into a test image, and extracting an overlapped image and a color image from the test image;

(c) respectively separating the genes in the spot form from the test image, generating a spot template and a background template including an area within a predetermined distance excluding the spot, and detecting an edge; and (d) outputting statistical data on the basis of the spot template and the background template generated in (b) or (c), and performing luminance correction, wherein in (d), various measured values including a mean value, a standard deviation, a central value, a mode, a spot's area and circumference, a number of holes in the spot, and a fragmentation state are stored as statistical data on the basis of the spot template and the background template.

* * * * *